US007883650B2

(12) United States Patent
Ma et al.

(10) Patent No.: US 7,883,650 B2
(45) Date of Patent: Feb. 8, 2011

(54) FABRICATION OF CARBON NANOTUBES REINFORCED POLYMER COMPOSITE BIPOLAR PLATES FOR FUEL CELL

(75) Inventors: Chen-Chi Martin Ma, Hsinchu (TW);
Chih-Hung Hung, Hsinchu (TW);
Shu-Hang Liao, Hsinchu (TW);
Chuan-Yu Yen, Hsinchu (TW);
Jeng-Chih Weng, Hsinchu (TW);
Yu-Feng Lin, Hsinchu (TW)

(73) Assignee: National Tsing Hua University (TW)

( * ) Notice: Subject to any disclaimer, the term of this patent is extended or adjusted under 35 U.S.C. 154(b) by 7 days.

(21) Appl. No.: 12/289,046

(22) Filed: Oct. 20, 2008

(65) Prior Publication Data

US 2010/0059718 A1 Mar. 11, 2010

(30) Foreign Application Priority Data

Sep. 8, 2008 (TW) ............................... 97134469 A

(51) Int. Cl.
*C04B 35/00* (2006.01)
(52) U.S. Cl. ..................... 264/105; 252/502; 252/511; 977/745; 977/748
(58) Field of Classification Search ................. 264/239, 264/241, 105; 252/502, 511; 429/210; 977/745, 977/748
See application file for complete search history.

(56) References Cited

U.S. PATENT DOCUMENTS

| 6,248,467 | B1 * | 6/2001 | Wilson et al. | .................. | 429/39 |
| 2005/0001352 | A1 * | 1/2005 | Ma et al. | ..................... | 264/241 |
| 2005/0186378 | A1 * | 8/2005 | Bhatt | ........................ | 428/36.9 |
| 2008/0280202 | A1 * | 11/2008 | Yen et al. | ..................... | 429/210 |
| 2008/0306202 | A1 * | 12/2008 | Lin et al. | ..................... | 524/432 |

OTHER PUBLICATIONS

Onoe-Step functionalization of carbon nanotubes y free-radical modification for the preparation of nanocomposite bipolar plates in polymer electrolyte membrane fuel cells, Liao et al., Journal of Materials Chemistry, 2008, vol. 18, pp. 3993-4002.*
Functionalizing multi-walled carbon nanotubes with poly(oxyalkylene)-amidoamines, Lin et al., Nanotechnology, vol. 17, 2006, pp. 3197-3203.*

* cited by examiner

*Primary Examiner*—Harold Y Pyon
*Assistant Examiner*—Haidung D Nguyen
(74) *Attorney, Agent, or Firm*—Bacon & Thomas, PLLC

(57) ABSTRACT

A composite bipolar plate for a polymer electrolyte membrane fuel cell (PEMFC) is prepared as follows: a) compounding vinyl ester and graphite powder to form bulk molding compound (BMC) material, the graphite powder content ranging from 60 wt % to 95 wt % based on the total weight of the graphite powder and vinyl ester, wherein carbon nanotubes together with a polyether amine dispersant or modified carbon nanotubes 0.05-10 wt %, based on the weight of the vinyl ester resin, are added during the compounding; b) molding the BMC material from step a) to form a bipolar plates having a desired shaped at 80-200° C. and 500-4000 psi.

9 Claims, 3 Drawing Sheets

US 7,883,650 B2

FABRICATION OF CARBON NANOTUBES REINFORCED POLYMER COMPOSITE BIPOLAR PLATES FOR FUEL CELL

FIELD OF THE INVENTION

The present invention relates to a method for preparing a fuel cell composite bipolar plate, particularly a method for preparing a carbon nanotubes reinforced polymer composite bipolar plate for a fuel cell by a bulk molding compound (BMC) process with a carbon nanotube dispersing technique.

BACKGROUND OF THE INVENTION

USP 2005/0025694 A1 has discloses a method for stably dispersing carbon nanotubes (CNTs) in an aqueous solution or oil, wherein the CNTs can be multi-walled or single-walled. According to the invention, there is no need of modifying the surface of CNTs into hydrophilic nature. The disclosed method only requires adding a selective dispersion agent and then the resulting mixture is mixed and dispersed using ultrasonic oscillation or a high shear homogenizer rotating at a high speed for achieving the objective of uniformly dispersing CNTs in the aqueous solution. A dispersion agent with an HLB value less than 8 is chosen if the CNTs are to be dispersed in oil; a dispersion agent with an HLB value greater than 10 is chosen if the CNTs are to be dispersed in the water phase.

According to CN 1667040 A1, the surfaces of CNTs are modified by at least a coupling agent selected from the group consisting of a silane coupling agent and a titanate coupling agent in an organic solvent which is selected from the group consisting of xylene, n-butanol, and cyclohexanone. After thorough mixing, the mixture is added with at least a dispersion agent selected from the group consisting of polypriopionate and modified polyurethane. After receiving an ultrasonic treatment, the mixture is uniformly dispersed in an epoxy resin by using a high speed agitation disperser. According to this modification/dispersion method, CNTs are dispersed easily, uniformly, and stably. The resulting CNT/polymer composites are a good antistatic material with good corrosion resistance, heat resistance, solvent resistance, high strength, and high adhesion.

USP 2004/0136894 A1 provides a method for dispersing CNTs in liquid or polymer, which comprises modifying the surfaces of CNTs by adding nitric acid to CNTs and refluxing the resulting mixture in 120° C. oil bath for 4 hours, so that functional groups are grafted onto the defective sites on the surfaces of the CNTs; adding a polar volatile solvent as medium to disperse the modified CNTs therein by stirring with a stirrer or ultrasonication with help from a polar force from the solvent which is able to dissolve a polymer or resin to be added; and adding the polymer or resin to the resulting dispersion, and evaporating the solvent to obtain uniform dispersion of the CNTs in the polymer or resin.

USP 2006/0058443 A1 discloses a composite material with reinforced mechanical strength by using CNTs. According to the invention, CNTs receive ultraviolet irradiation first, followed by a plasma treatment or treated with an oxidization agent, e.g. sulfuric acid or nitric acid, in order to obtain CNTs with hydrophilic groups. Subsequently, a surfactant is used to disperse the hydrophilic CNTs in a polymeric resin in order to obtain a composite material with reinforced mechanical strength by CNTs.

USP 2006/0052509 A1 discloses a method of preparing a CNT composite without adversely affecting the properties of CNTs per se. According to the invention, the surfaces of CNTs are grafted with a conductive polymer or heterocyclic trimer, which is soluble in water and contain sat least a sulfuric group and carboxylic group. The resulting CNTs are dispersed or dissolved in water, organic solvent, or organic aqueous solution after receiving ultrasonic oscillation. Even after long term storage, such a dispersion or solution will not develop agglomeration. Furthermore, such a composite material has good conductivity and film formation properties, and is easy to be coated or used as a substrate.

U.S. Pat. No. 7,090,793 discloses a composite bipolar plate of polymer electrolyte membrane fuel cells (PEMFC), which is prepared as follows: a) preparing a bulk molding compound (BMC) material containing a vinyl ester resin and a graphite powder, the graphite powder content of BMC material ranging from 60 wt % to 80 wt %, based on the compounded mixture; b) molding the BMC material from step a) to form a bipolar plate having a desired shape at 80-200° C. and 500-4000 psi, wherein the graphite powder is of 10 mesh-80 mesh. Details of the disclosure in this US patent are incorporated herein by reference.

Taiwan patent publication No. 200624604, published 16 Jul. 2006, discloses a PEMFC, which is prepared as follows: a) compounding phenolic resin and carbon fillers to form bulk molding compound (BMC) material, the BMC material containing 60 to 80 wt % graphite powder, 1 to 10 wt % carbon fiber; and one ore more conductive carbon fillers selected from: 5 to 30 wt % Ni-planted graphite powder, 2 to 8 wt % Ni-planted carbon fiber and 0.01 to 0.3 wt % carbon nanotubes, based on the weight of the phenolic resin, provided that the sum of the amounts of the carbon fiber and Ni-planted carbon fiber is not greater than 10 wt %; b) molding the BMC material from step a) to form a bipolar plates having a desired shape at 80-200° C. and 500-4000 psi. The carbon nanotubes used in this prior art are single-walled or double-walled carbon nanotubes having a diameter of 0.7-50 nm, length of 1-1000 μm, specific surface area of 40-1000 $m^2/g$. Details of the disclosure in this Taiwan patent publication are incorporated herein by reference.

USP 2006/0267235 A1 discloses a composite bipolar plate for a PEMFC, which is prepared as follows: a) compounding vinyl ester and graphite powder to form bulk molding compound (BMC) material, the graphite powder content ranging from 60 wt % to 95 wt % based on the total weight of the graphite powder and vinyl ester, wherein carbon fiber 1-20 wt %, modified organo clay or noble metal plated modified organo clay 0.5-10 wt %, and one or more conductive fillers selected form: carbon nanotube (CNT) 0.1-5 wt %, nickel plated carbon fiber 0.5-10 wt %, nickel plated graphite 2.5-40 wt %, and carbon black 2-30 wt %, based on the weight of the vinyl ester resin, are added during the compounding; b) molding the BMC material from step a) to form a bipolar plate having a desired shaped at 80-200° C. and 500-4000 psi. Details of the disclosure in this US patent publication are incorporated herein by reference.

USP 2007/0241475 A1 discloses a composite bipolar plate for a PEMFC, which is prepared as follows: a) compounding vinyl ester and graphite powder to form bulk molding compound (BMC) material, the graphite powder content ranging from 60 wt % to 95 wt % based on the total weight of the graphite powder and vinyl ester, wherein 0.5-10 wt % modified organo clay by intercalating with a polyether amine, based on the weight of the vinyl ester resin, is added during the compounding; b) molding the BMC material from step a) to form a bipolar plates having a desired shaped at 80-200° C. and 500-4000 psi. Details of the disclosure in this US patent publication are incorporated herein by reference.

U.S. patent application Ser. No. 11/812,405, filed 19 Jun. 2007, commonly assigned to the assignee of the present application discloses $TiO_2$-coated CNTs formed by a sol-gel method or hydrothermal method. Furthermore, the $TiO_2$-coated CNTs are modified with a coupling agent to endow the $TiO_2$-coated CNTs with affinity to polymer substrates. The modified $TiO_2$-coated CNTs can be used as an additive in polymers or ceramic materials for increase the mechanical strength of the resulting composite materials. The CNT/polymer composite material prepared according to this prior art can be used to impregnate fiber cloth to form a prepreg material. Details of the disclosure in this US patent application are incorporated herein by reference.

To this date, the industry is still continuously looking for a smaller fuel cell bipolar plate having a high electric conductivity, excellent mechanical properties, a high thermal stability and a high size stability.

SUMMARY OF THE INVENTION

One primary objective of the present invention is to provide a small size fuel cell bipolar plate having a high electrical conductivity, and excellent mechanical properties.

Another objective of the present invention is to provide a method for preparing a small size fuel cell bipolar plate having a high electrical conductivity, and excellent mechanical properties.

The process for preparing a composite bipolar plate for a polymer electrolyte membrane fuel cell (PEMFC) according to one of the preferred embodiments the present invention uses a bulk molding compound (BMC) material comprising vinyl ester, a conductive carbon, carbon nanotubes and a dispersant. The dispersant preferably is a polyether amine having a molecular weight greater than 200, and more preferably having a weight-averaged molecular weight of 230-4000. In this preferred embodiment, a high performance vinyl ester/graphite composite bipolar plate was prepared from a dispersant of poly(propylene glycol)-bis-(2-aminopropyl ether)amine having a weight-averaged molecular weight of 2000, which has a volume conductivity greater than 200 S/cm and a flexural strength as high as about 42 MPa. The volume conductivity greater than 200 S/cm is significantly higher than the technical criteria index of 100 S/cm of DOE of US.

In another preferred embodiments the present invention the bulk molding compound (BMC) material comprising vinyl ester, a conductive carbon, and carbon nanotubes modified with the polyether amine. In this another preferred embodiment, carbon nanotubes are grafted with poly(propylene glycol)-bis-(2-aminopropyl ether)amine having a weight-averaged molecular weight of 2000 in the presence of a free radical initiator of benzoyl peroxide (hereinafter abbreviated as BPO), and a high performance vinyl ester/graphite composite bipolar plate prepared from the modified carbon nanotubes has a volume conductivity greater than 200 S/cm and a flexural strength as high as about 47 MPa. The volume conductivity greater than 200 S/cm is significantly higher than the technical criteria index of 100 S/cm of DOE of US.

In order to accomplish the aforesaid objectives a process for preparing a composite bipolar plate for a polymer electrolyte membrane fuel cell (PEMFC) according to the present invention comprises:

a) compounding vinyl ester and graphite powder to form bulk molding compound (BMC) material, the graphite powder content ranging from 60 wt % to 95 wt % based on the total weight of the graphite powder and vinyl ester, wherein i) 0.05-10 wt % carbon nanotubes and 0.05-10 wt % polyether amine dispersant, or ii) 0.05-10 wt % carbon nanotubes modified with polyether amine, based on the weight of the vinyl ester resin, is added during the compounding;

b) molding the BMC material from step a) to form a bipolar plate having a desired shaped at 80-200° C. and 500-4000 psi.

Preferably, i) 0.05-10 wt % carbon nanotubes and 0.05-10 wt % polyether amine dispersant is added to during the compounding in step a), and the polyether amine is 0.1-200 wt % of the carbon nanotubes.

Preferably, ii) 0.05-10 wt % carbon nanotubes modified with polyether amine is added to during the compounding in step a). More preferably, said modified carbon nanotubes are prepared by a process comprising the following steps: A) conducting a ring-opening reaction between the polyether amine and a dicarboxylic acid anhydride containing an ethylenically unsaturated group, so that a polyamic acid is formed; B) adding carbon nanotubes and a free radical initiator to the resulting reaction mixture from step A), and conducting a grafting reaction so that the polyamic acid is linked to the carbon nanotubes, wherein the polyether amine added is in an amount of 1-300 wt % of the carbon nanotubes added, and the free radical initiator added is in an amount of 0.1-150 wt % of the carbon nanotubes added or 50-200 mole % of the polyether amine. The free radical initiator added is in an amount of 1-100 wt % of the polyether amine. The free radical initiator can be any one known in the art, for examples a peroxide, hydroperoxide, azonitrile, redox system, persulfate, and perbenzoate. In one of the preferred embodiments of the present invention said free radical initiator is benzoyl peroxide, and said dicarboxylic acid anhydride containing an ethylenically unsaturated group is maleic anhydride.

Preferably, the polyether amine is polyether diamine having two terminal amino groups, and having a weight-averaged molecular weight of 200-4000, such as poly(propylene glycol)-bis-(2-aminopropyl ether) or poly(butylene glycol)-bis-(2-aminobutyl ether).

Preferably, said carbon nanotubes are single-walled, double-walled or multi-walled carbon nanotubes, carbon nanohorns or carbon nanocapsules. More preferably, said carbon nanotubes are single-walled, double-walled or multi-walled carbon nanotubes having a diameter of 10-50 nm, a length of 1-25 μm, a specific surface area of 150-250 $m^2g^{-1}$, and an aspect ratio of 10-1000 $m^2/g$.

Preferably, particles of said graphite powder have a size of 10-80 mesh. More preferably, less than 10 wt % of the particles of the graphite powder are larger than 40 mesh, and the remaining particles of the graphite powder have a size of 40-80 mesh.

Preferably, a free radical initiator in an amount of 1-10% based on the weight of said vinyl ester resin is added during said compounding in step a). More preferably, said free radical initiator is selected from the group consisting of peroxide, hydroperoxide, azonitrile, redox system, persulfate, and perbenzoate. Most preferably, said free radical initiator is t-butyl peroxybenzoate.

Preferably, a mold releasing agent in an amount of 1-10%, based on the weight of said vinyl ester resin is added during said compounding in step a). More preferably, said mold releasing agent is wax or metal stearate. Most preferably, said mold releasing agent is metal stearate.

Preferably, a low shrinking agent in an amount of 5-20%, based on the weight of said vinyl ester resin is added during said compounding in step a). More preferably, said low shrinking agent is selected from the group consisting of styrene-monomer-diluted polystyrene resin, copolymer of styrene and acrylic acid, poly(vinyl acetate), copolymer of vinyl acetate and acrylic acid, copolymer of vinyl acetate and itaconic acid, and terpolymer of vinyl acetate, acrylic acid and itaconic acid. Most preferably, said low shrinking agent is styrene-monomer-diluted polystyrene resin.

Preferably, a tackifier in an amount of 1-10%, based on the weight of said vinyl ester resin is added during said compounding in step a). More preferably, said tackifier is selected from the group consisting of alkaline earth metal oxides, alkaline earth metal hydroxides, carbodiamides, aziridines, and polyisocyanates. Most preferably, said tackifier is calcium oxide or magnesium oxide.

Preferably, a solvent in an amount of 10-35%, based on the weight of said vinyl ester resin is added during said compounding in step a). More preferably, said solvent is selected from the group consisting of styrene monomer, alpha-methyl styrene monomer, chloro-styrene monomer, vinyl toluene monomer, divinyl toluene monomer, diallylphthalate monomer, and methyl methacrylate monomer. Most preferably, said solvent is styrene monomer.

The vinyl ester resins suitable for use in the present invention have been described in U.S. Pat. No. 6,248,467 which are (meth)acrylated epoxy polyesters, preferably having a glass transition temperature (Tg) of over 180° C. Suitable examples of said vinyl ester resins include, but not limited to, bisphenol-A epoxy-based methacrylate, bisphenol-A epoxy-based acrylate, tetrabromo bisphenol-A epoxy-based methacrylate, and phenol-novolac epoxy-based methacrylate, wherein phenol-novolac epoxy-based methacrylate is preferred. Said vinyl ester resins have a molecular weight of about 500~10000, and an acid value of about 4 mg/1 hKOH-40 mg/1 hKOH.

The method for preparing a small size composite bipolar plate according to the present invention, which uses modified carbon nanotubes or carbon nanotubes/dispersant without using carbon fibers to reinforce the composite bipolar plate, can effectively enhance mechanical properties, thermal stability, and size stability, without substantially sacrificing its conductivity, which still meets the commercial requirement.

DETAILED DESCRIPTION OF THE INVENTION

Figure 1:
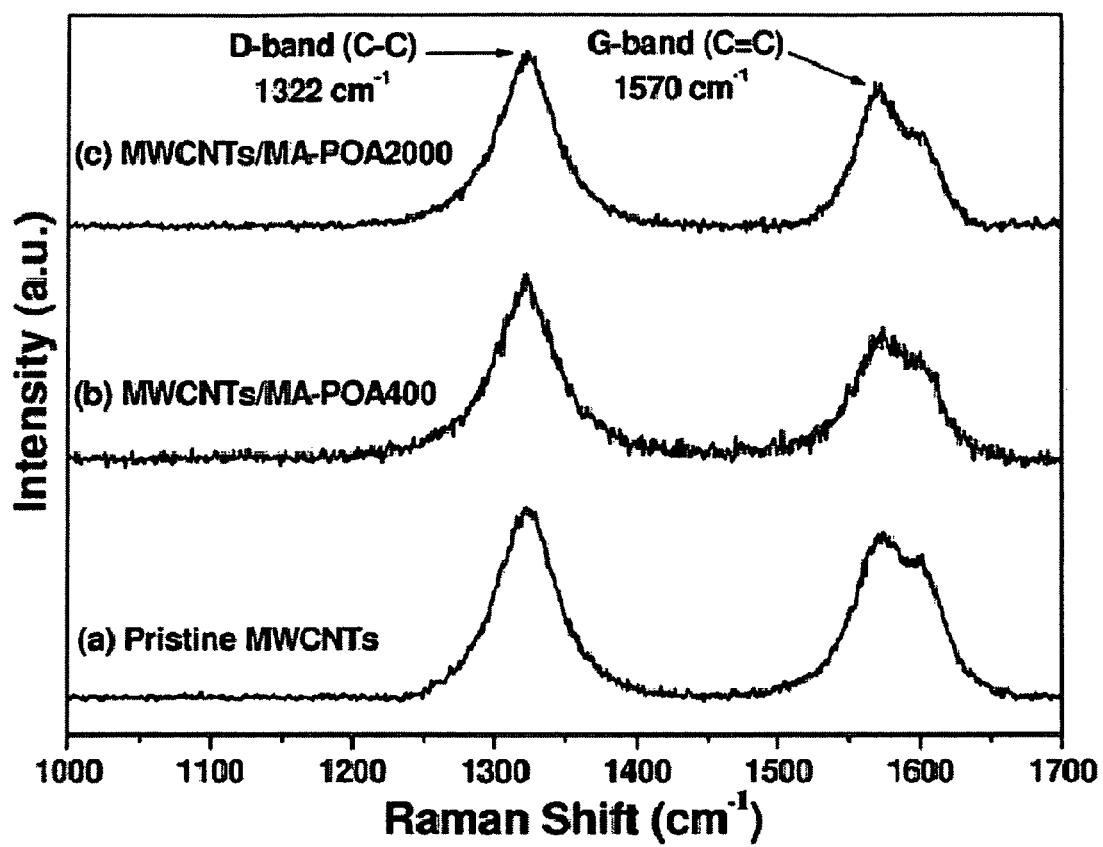
FIG. 1 is Raman spectra of: (a) pristine MWCNTs, and the functionalized MWCNTs, MWCNTs/MA-POA400 (b) and MWCNTs/MA-POA2000 (c), of the present invention.

According to the present invention, a composite bipolar plate is produced by a bulk molding compound (BMC) process using a vinyl ester resin.

The vinyl ester resin, initiators, polyether amines, and carbon nanotubes among other materials used in the following examples and controls are described as follows:

Vinyl ester resin: phenolic-novolac epoxy-based (methacrylate) resin having the following structure, which is available as code SW930-10 from SWANCOR IND. CO., LTD, No. 9, Industry South 6 Rd, Nan Kang Industrial Park, Nan-Tou City, Taiwan:

Initiator: t-Butyl peroxybenzoate (TBPB) having the following structure, which is available as code TBPB-98 from Taiwan Chiang-Ya Co, Ltd., 4 of 8$^{th}$ Fl, No. 345, Chunghe Rd, Yuanhe City, Taipei Hsien:

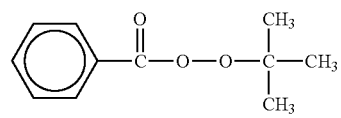

Polyether diamine: poly(oxyalkylene)amines (abbreviated as POA), Jeffamine® D-series, available from Hunstsman Corp., Philadelphia, Pa., having the following structure:

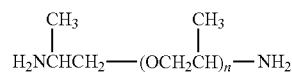

Jeffamine® D-400 (n=5~6); Mw~400

Jeffamine® D-2000 (n=33); Mw~2000

Multi-Walled CNT (abbreviated as MWCNT) produced by The CNT Company, Inchon, Korea, and sold under a code of $C_{tube}$100. This type of CNT was prepared by a CVD process. The CNTs had a purity of 95%, a diameter of 10-50 nm, a length of 1-25 μm, and a specific surface area of 150-250 $m^2g^{-1}$.

Maleic anhydride (abbreviated as MA) was obtained from Showa Chemical Co., Gyoda City, Saotama, Japan.

Tetrahydrofuran, anhydrous, stabilized (THF) was supplied by Lancaster Co., Eastgare, White Lund, Morecambe, England.

Benzoyl peroxide (BPO) was received from Fluka Chemie. Co., Buchs, Switzerland.

Preparation Example 1

Preparation of MWCNTs/MA-POA400 and MWCNTs/MA-POA2000 by Free-Radical Modification Scheme 1 depicts an overview of covalent grafting procedures for preparing the modified carbon nanotubes.

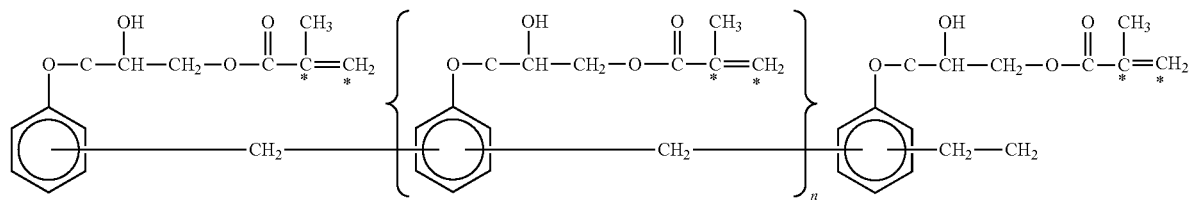

wherein n=1~3.

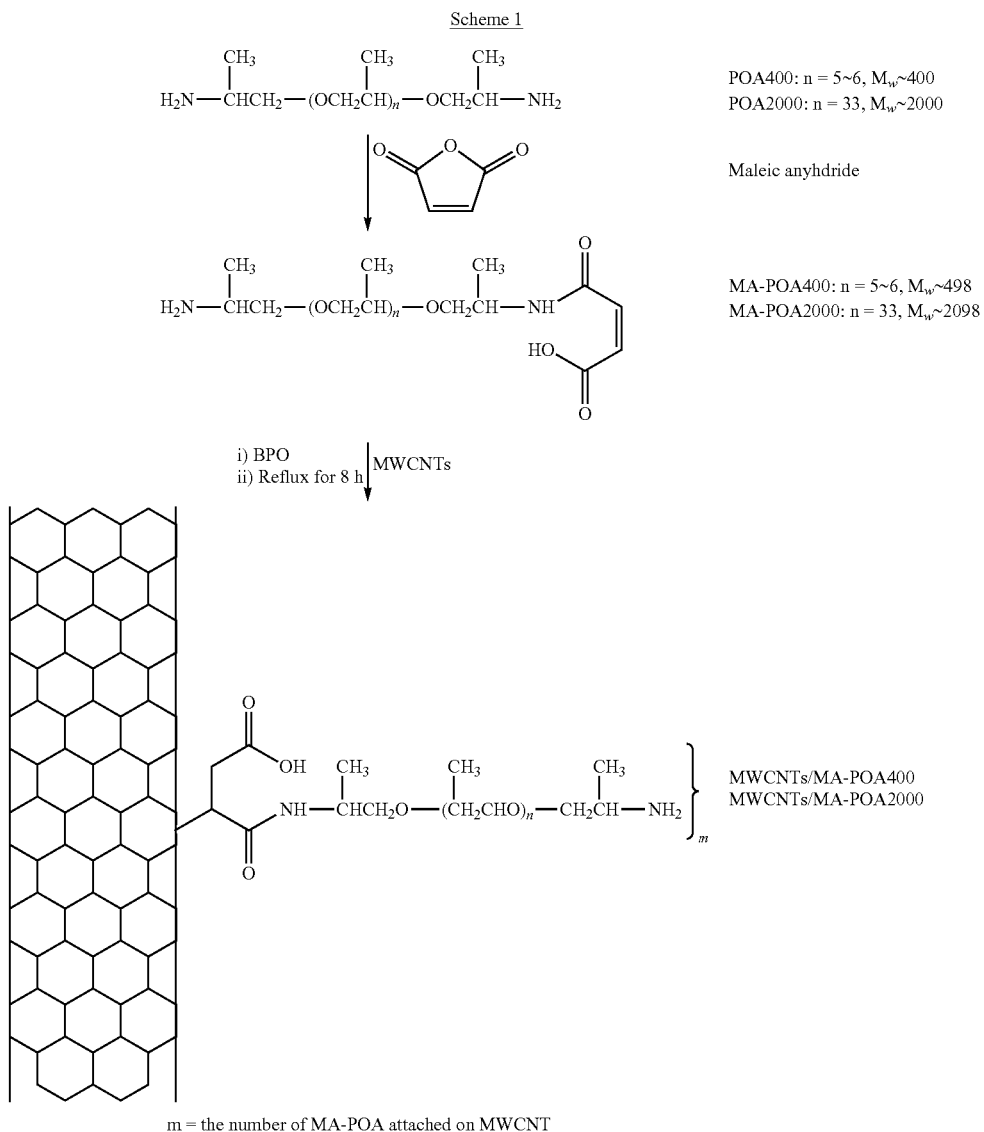

m = the number of MA-POA attached on MWCNT

The preparation of poly(oxypropylene)diamines with various molecular weights (Mw 400 and 2000 g/mol) bearing one maleic anhydride (abbreviated as MA-POA400 and MA-POA2000) was carried out in a glass reactor equipped with a stirrer. The designated amount of maleic anhydride (15.68 g, 160 mmol) was slowly added to a reactor charged with polyether amine (160 mmol), and then stirred mechanically at 25° C. for 24 h. In order to prepare MWCNTs/MA-POA400 and MWCNTs/MA-POA2000, first 200 mg MWCNTs was suspended in 100 ml THF by shear mixed for 1 h and ultrasonication for 15 min. Subsequently, MA-POA400 (1.33 g, 2.67 mmol) and MA-POA2000 (5.6 g, 2.67 mmol) dissolved in 10 ml THF was slowly added into MWCNT suspension, and the mixture was further shear mixed at 80° C. by refluxing for 8 h. The free radical reaction was initiated by BPO. After the grafting polymerization, the mixture was separated by filtration through 0.2 μm polytetrafluoroethylene (PTFE) membrane and thoroughly washed with anhydrous THF several times to remove the residual MA-POA400 and MA-POA2000, and then dried in a vacuum oven at 80° C. overnight to remove the solvent. Through this method, the functionalized MWCNTs (MWCNTs/MA-POA400 and MWCNTs/MA-POA2000) were obtained.

Identification of Modified MWCNTS

Raman spectra were recorded with LabRam I confocal Raman spectrometer (Dilor, France). The excitation wavelength was 632.8 nm from a He—Ne laser with a laser power of ca. 15 mW at the sample surface. A holographic notch filter reflected the exciting line into an Olympus BX40 microscope (Tokyo, Japan). X-Ray photoelectron spectra (XPS) measurements were performed using a VG Scientific ESCALAB 220 iXL spectrometer equipped with a hemispherical electron analyzer and an Mg Kα (hυ=1487.7 eV) X-ray source. A small spot lens system allowed analysis of a sample that was less than 1 mm$^2$ in area.

Raman spectroscopy is a powerful tool to investigate the extent of disorder in the functionalized MWCNTs. FIG. 1 presents the Raman spectra of MWCNTs before and after MA-POA400 and MA-POA2000 grafting. The D- and G-bands at ~1322 cm$^{-1}$ and ~1570 cm$^{-1}$, respectively, attributed to defects/disorder-induced modes (or sp$^3$-hybridized carbons) and in-plane vibrations of the graphite wall (or sp$^2$-hybridized carbons), are clearly observable for both pristine and functionalized MWCNTs. The extent of defects in graphite materials upon surface modification can be quantified by the area ratio of D- to G-bands (i.e. $D_a/G_a$). The $D_a/G_a$ area ratio of the pristine MWCNTs is ca. 0.96. For the MWCNTs/MA-POA400 and -POA2000, the $D_a/G_a$ area ratios are ~1.39 and 1.41, respectively (Curves b and c), showing increased $D_a/G_a$ values compared with pristine MWCNTs. Therefore, the increase in $D_a/G_a$ area ratios after functionalization reveals the formation of defects or functional group on the surfaces of MWCNTs due to covalently grafting of MA-POA400 and MA-POA2000 chains under free-radical modification.

Figure 2:
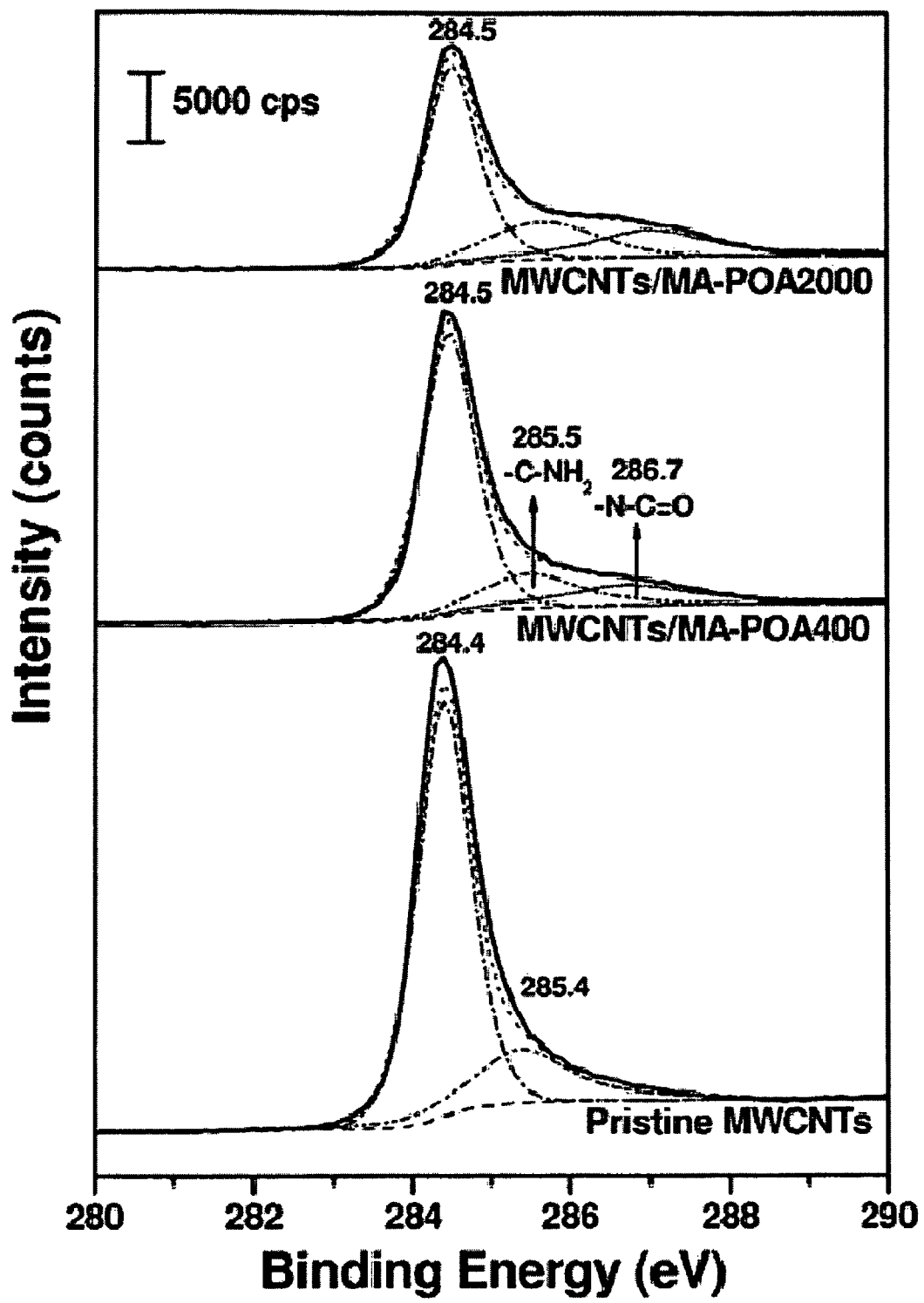
FIG. 2 is high-resolution C1s core-level XPS spectra of the surface of pristine MWCNTs, and the functionalized MWCNTs, MWCNTs/MA-POA400 and MWCNTs/MA-POA2000, of the present invention.

Qualitative XPS analysis were conducted to elucidate surface composition of functionalized MWCNTs. The C1s core level spectra of pristine and functionalized MWCNTs are presented in FIG. 2. Aside from the C—C peak of MWCNTs at 284.4 eV, additional peaks present at higher binding energies for functionalized MWCNTs indicate the presence of carbon atoms bonded to other functional groups. The binding energy peak for the as-received MWCNTs at 285.4 eV, 1 eV higher than the main C—C peak, is attributed to atmospheric oxidation or residual oxides resulting from the MWCNT purification process. For the MWCNTs/MA-POA400 and MWCNTs/MA-POA2000, XPS results show the main C1s peak at 284.5 eV and additional higher energy peaks at 285.5 and 286.7 eV, originating from the —C—NH$_2$ and —N—C=O structures, respectively. Because the chemical scheme we used is expected generation of amine and amide carbons in equal quantity (Scheme 1), the C1s spectrum of functionalized MWCNTs show that both —C—NH$_2$ and —N—C=O functionalities have a peak area ratio 1:1. This ratio is consistent with the MA-POA molecule structure linked to the MWCNT surface.

Figure 3:
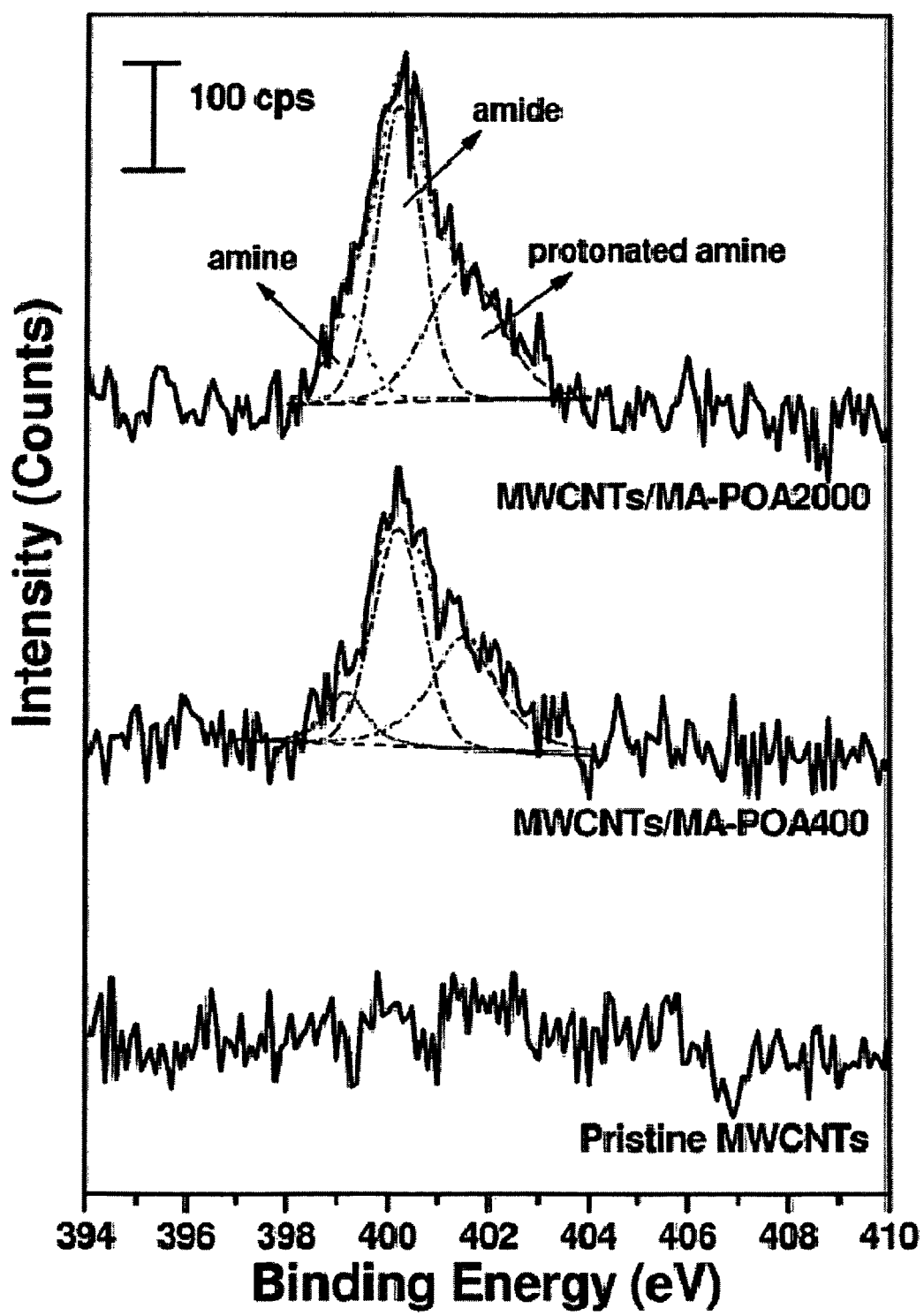
FIG. 3 is high-resolution N1s core-level XPS spectra of the surface of pristine MWCNTs, and the functionalized MWCNTs, MWCNTs/MA-POA400 and MWCNTs/MA-POA2000, of the present invention.

N1s core-level XPS spectra further confirm the presence of the amino and amine group of functionalized MWCNTs and provide a comparison on their abundance relative to pristine MWCNTs. Two main N1s peaks indicate two different nitrogen environments in the MWCNTs/MA-POA400 and MWCNTs/MA-POA2000 system, as shown in FIG. 3. The low binding-energy at 399.2 eV is the characteristic peak of nitrogen of the amine group placed in terminal position of MA-POA chains, and the peak at 400.2 eV is attributed to nitrogen of the amide group with linkage of MA-POA chains and MWCNT walls. Previous studies show that N1s binding energies for amines and amides are expected to be between ~398.5 and 400.5 eV. The assignment is based on the consideration that amide nitrogen bears a partial positive charge because of the resonance structure, and therefore its binding energy is larger. Accordingly, this amine and amide presence also agrees well with the expected structure of MA-POA. In addition, it is of interest to note the presence of an extra peak at 401.6 eV which is contributed to protonated amine. A similar observation was found the 2.4 eV difference between the protonated amine peak and the amine peak very close to previously reported values. As anticipated, there were no N1s peaks observed in the pristine MWCNTs. Therefore, these XPS results clearly indicate that the MA-POA400 and MA-POA2000 was covalently grafted onto the MWCNT surface.

Control Example 1

The graphite powder used in Control Example 1 consisted of not more than 10% of particles larger than 40 mesh (420 μm in diameter), about 40% of particles between 40 mesh and 60 mesh (420-250 μm in diameter), and about 50% of particles between 60 mesh and 80 mesh (250-177 μm in diameter).

Preparation of BMC Material and Specimen 1. 192 g of a solution was prepared by dissolving 144 g of vinyl ester resin resin and 16 g of styrene-monomer-diluted polystyrene (as a low shrinking agent) in 32 g of styrene monomer as a solvent. 3.456 g of TBPB was added as an initiator, 3.456 g of MgO was added as a tackifier, and 6.72 g of zinc stearate was added as a mold releasing agent.
2. 1.98 g of MWCNTs (1 wt %) was added to the solution resulting from step 1, which was then agitated in a motorized mixer at room temperature under ultrasonication for 30 minutes.
3. The mixture resulting from step 2, and 448 g of graphite powder were poured into a Bulk Molding Compound (BMC) kneader to be mixed homogeneously by forward-and-backward rotations for a kneading time of about 30 minutes. The kneading operation was stopped and the mixed material was removed from the mixer to be tackified at room temperature for 36 hours.
4. Prior to thermal compression of specimens, the material was divided into several lumps of molding material with each lump weighing 3 g.
5. A slab mold was fastened to the upper and lower platforms of a hot press. The pre-heating temperature of the molds were set to 140° C. After the temperature had reached the set point, the lump was disposed at the center of the molds and pressed with a pressure of 3000 psi to form a specimen. After 300 seconds, the mold was opened automatically, and the specimen was removed.

Examples A1, A2, B1 AND B2

The steps in Control Example 1 were repeated to prepare lumps of molding material and specimens, except that a polyether amine dispersant was added together with the MWCNTs used in step 2 or the MWCNTs used in step 2 were replaced with the modified MWCNTs prepared in Preparation Example 1. The amount of the dispersant and the modified MWCNTs added are listed in Table 1.

TABLE 1

| Example | MWCNTs/dispersant | Amount of pristine MWCNTs, g (wt %)* | Amount of dispersant or modified MWCNTs, g |
|---------|-------------------|---------------------------------------|---------------------------------------------|
| A1 | Pristine MWCNTs/dispersant Jeffamine ® D400 | 1.98 (1%) | 0.55 |
| A2 | MWCNTs/dispersant Jeffamine ® D2000 | 1.98 (1%) | 2.21 |
| B1 | MWCNTs modified with Jeffamine ® D400 | 1.98 (1%) | 2.02 |
| B2 | MWCNTs modified with Jeffamine ® D2000 | 1.98 (1%) | 2.15 |
| Control Ex. 1 | Pristine MWCNTs | 1.98 (1%) | 0 |

*%, based on the weight of the vinyl ester resin solution prepared in Step 1.

Electrical Properties:

Test Method:

A four-point probe resistivity meter was used by applying a voltage and an electric current on the surface of a specimen at one end, measuring at the other end the voltage and the electric current passed through the specimen, and using the Ohm's law to obtain the volume resistivity (ρ) of the specimen according to the formula, $$\rho = \frac{V}{I} * W * CF$$

(formula 1), wherein V is the voltage passed through the specimen, I is the electric current passed through the specimen, a ratio thereof is the surface resistivity, W is the thickness of the specimen, and CF is the correction factor. The thermally compressed specimens from the example and the controls were about 100 mm×100 mm with a thickness of 1.5 mm. The correction factor (CF) for the specimens was 4.5. Formula 1 was used to obtain the volume resistivity (ρ) and an inversion of the volume resistivity is the electric conductivity of a specimen.

Results:

Table 2 shows the resistivity measured for the polymer composite bipolar plates prepared above and the interlayer space of the clays used in the preparation of the bipolar plates. The measured resistivities for the polymer composite bipolar plates prepared in Control Example 1 and Examples A1, A2, B1 and B2 respectively are 1.95 mΩ, 1.58 mΩ, 1.34 mΩ, 1.04 mΩ and 0.75 mΩ. Table 3 shows the electric conductivity measured for the polymer composite bipolar plates prepared above. The measured conductivities for the polymer composite bipolar plates prepared in Control Example 1 and Examples A1, A2, B1 and B2 respectively are 513 S/cm, 633 S/cm, 744 S/cm, 956 S/cm and 1340 S/cm. The poor dispersion of MWCNTs in the polymer matrix, which typically appear as clusters in the polymer matrix, is recognized as a lack of chemical compatibility. For pristine MWCNTs, the formation of local MWCNT aggregates tend to increase the number of filler-filler hops required to traverse a given distance, thus causing decreased in-plane electrical conductivity, i.e. increased resistivity. The driving force for better in-plane conductivity of functionalized MWCNT polymer composite bipolar plates is better dispersion of MWCNTs in the polymer matrix, due to the introduction of polyether amine and the polyether amine grafted to the surface of MWCNTs. Well dispersed MWCNTs inside the polymer matrix easily come into contact with each other and thus construct a much more efficient electrical network in the polymer composite bipolar plates.

TABLE 2

|  | Resistivity (mΩ) |
| --- | --- |
| Control Ex. 1 | 1.95 |
| Example A1 | 1.58 |
| Example A2 | 1.34 |
| Example B1 | 1.04 |
| Example B2 | 0.75 |

TABLE 3

|  | Conductivity (S/cm) |
| --- | --- |
| Control Ex. 1 | 513 |
| Example A1 | 633 |
| Example A2 | 744 |
| Example B1 | 956 |
| Example B2 | 1340 |

Mechanical property: Test for flexural strength

Method of test: ASTM D790

Results:

Table 4 shows the test results of flexural strength for polymer composite bipolar plates prepared above. The measured flexural strength for the polymer composite bipolar plates prepared in Control Example 1 and Examples A1, A2, B1 and B2 respectively are 37.00±1.30 MPa, 38.84±0.12 MPa, 41.61±0.39 MPa, 42.26±0.83 MPa, and 47.14±0.34. The results indicate that addition of MWCNTs together with the polyether amine dispersant will better enhance the flexural strength in comparison with the addition of MWCNTs alone. In comparison with the results of Control Example 1 and Example A2, the flexural strength of the latter is 17% greater than that of the former. The results also indicate that addition of modified MWCNTs will best enhance the flexural strength among the cases where MWCNTs are added with or without the polyether amine dispersant. In comparison with the results of Control Example 1 and Example B2, the flexural strength of the latter is 27% greater than that of the former.

TABLE 4

|  | Flexural strength (MPa) |
| --- | --- |
| Control Ex. 1 | 37.00 ± 1.30 |
| Example A1 | 38.84 ± 0.12 |
| Example A2 | 41.61 ± 0.39 |
| Example B1 | 42.26 ± 0.83 |
| Example B2 | 47.14 ± 0.34 |

Mechanical property: Test for impact strength

Method of test: ASTM D256

Results:

Table 5 shows the test results of notched Izod impact strength for polymer composite bipolar plates prepared above. The measured notched Izod impact strength for the polymer composite bipolar plates prepared in Control Example 1 and Examples A1, A2, B1 and B2 respectively are 70.73 J/m, 79.99 J/m, 85.65 J/m, 105.94 J/m and 108.50 J/m. The results indicate that addition of MWCNTs together with the polyether amine dispersant will better enhance the notched Izod impact strength in comparison with the addition of MWCNTs alone. In comparison with the results of Control Example 1 and Example A2, the flexural strength of the latter is 21% greater than that of the former. The results also indicate that addition of modified MWCNTs will best enhance the notched Izod impact strength among the cases where MWCNTs are added with or without the polyether amine dispersant. In comparison with the results of Control Example 1 and Example B2, the flexural strength of the latter is 53% greater than that of the former.

TABLE 5

|  | Impact strength (J/m) |
| --- | --- |
| Control Ex. 1 | 70.73 |
| Example A1 | 79.99 |
| Example A2 | 85.65 |
| Example B1 | 105.94 |
| Example B2 | 108.50 |

Corrosion property test:

Method of test: ASTM G5-94

Results:

Table 6 shows the test results of corrosion electric current test for polymer composite bipolar plates prepared above. The measured corrosion electric current for the polymer composite bipolar plates prepared in Control Example 1 and Examples A1, A2, B1 and B2 respectively are $3.93 \times 10^{-7}$, $2.10 \times 10^{-6}$, $3.19 \times 10^{-6}$, $5.43 \times 10^{-6}$ Amps/cm$^2$ and $7.59 \times 10^{-6}$ Amps/cm$^2$. The corrosion electric currents of a level of $10^{-7}$ and $10^{-6}$ Amps/cm$^2$ as shown in Table 6 indicate the bipolar plates have an excellent anti-corrosion property.

TABLE 6

| | Corrosion electric current (Amps/cm$^2$) |
|---|---|
| Control Ex. 1 | $3.93 \times 10^{-7}$ |
| Example A1 | $2.10 \times 10^{-6}$ |
| Example A2 | $3.19 \times 10^{-6}$ |
| Example B1 | $5.43 \times 10^{-6}$ |
| Example B2 | $7.59 \times 10^{-6}$ |

Coefficient of thermal expansion

Method of Test: ASTM D-696

Results:

PEMFC is operated at a temperature from room temperature to about 80° C. The bipolar plate has many delicate passages and MEA is clamped between two bipolar plates, so that the bipolar plate must have a good dimension stability during the temperature ramp from room temperature to about 80° C. in order to maintain the system function. The dimension stability of the bipolar plate can be determined by measuring coefficient of thermal expansion thereof.

Table 7 lists coefficients of thermal expansion measured for the bipolar plates prepared above. The measured coefficients of thermal expansion for the polymer composite bipolar plates prepared in Control Example 1 and Examples A1, A2, B1 and B2 respectively are 25.0 μm/m° C., 21.3 μm/m° C., 20.4 μm/m° C., 18.7 μm/m° C. and 16.7 μm/m° C. The results indicate that addition of MWCNTs together with the polyether amine dispersant will better reduce the thermal expansion coefficient in comparison with the addition of MWCNTs alone. In comparison with the results of Control Example 1 and Example A2, the thermal expansion coefficient of the latter is 17% less than that of the former. The results also indicate that addition of modified MWCNTs will best enhance the thermal expansion coefficient among the cases where MWCNTs are added with or without the polyether amine dispersant. In comparison with the results of Control Example 1 and Example B2, the thermal expansion coefficient of the latter is 33% less than that of the former.

TABLE 7

| | Coefficient of Thermal Expansion (μm/m° C.) |
|---|---|
| Control Ex. 1 | 25.0 |
| Example A1 | 21.3 |
| Example A2 | 20.4 |
| Example B1 | 18.7 |
| Example B2 | 16.7 |

Gas Tightness Test

Method of Test:

Two chambers are separated by the bipolar plate prepared above, one of which is maintained at vacuum pressure, and another of which is maintained at a pressure of 5 bar. The gas tightness of the polymer composite bipolar plate is determined by observing the pressure changes in the two chambers.

Results:

The bipolar plates in a PEMFC are gas flow fields, on which many delicate passages are formed. Hydrogen and air separately flow in the passages of two bipolar plates and diffuse through a gas diffusion membrane to MEA. The bipolar plate thus is required to have a good gas tightness to assure a high efficiency of the PEMFC.

Table 8 lists the gas tightness test results for the bipolar plates prepared above. It can be seen from Table 8 that the polymer composite bipolar plates prepared in Control Example 1 and Examples A1, A2, B1 and B2 all show good gas tightness.

TABLE 8

| | Gas tightness |
|---|---|
| Control Ex. 1 | No leaking |
| Example A1 | No leaking |
| Example A2 | No leaking |
| Example B1 | No leaking |
| Example B2 | No leaking |

The compositions for the BMC process in Control Example 1 and Examples A1-B2 are all the same except whether a dispersant being added or the carbon nanotubes being modified. In view of the results of Control Example 1 and Examples A1-A2, it is believed that the better mechanical properties in Examples A1 and A2 are due to effective isolation between MWCNTs from intermolecular attractive force introduced by the polyether amine dispersant, which avoids aggregation thereof. As to the modified MWCNTs with a linear MA-POA chain grafted to the surface thereof in Examples B1 and B2, the long chain of MA-POA creates repulsion effect between MWCNTs, which more efficiently avoids the aggregation of MWCNTs and renders a good dispersion of MWCNTs in the polymer matrix, and thus have the best mechanical properties in comparison with Control Example 1 and Examples A1 and A2. Similarly, the electrical conductivity of the bipolar plates prepared in Control Example 1 and Examples A1 to B2 has the same trend as the mechanical properties.

In view of the above test results, the small size polymer composite bipolar plate prepared in accordance with the method of the present invention is therefore readily to be applied commercially in view of its comprehensive performance. In the following Table 9, the conductivity and flexural strength of the polymer composite bipolar plates prepared in the prior art and Example B2 of the present invention are listed. It can be seen from Table 9 that the polymer composite bipolar plate prepared in Example B2 of the present invention has better performance in conductivity and flexural strength than U.S. Pat. No. 4,339,332 and U.S. Pat. No. 6,248,467.

TABLE 9

| Resin | Filler, wt % | Conductivity (S/cm) | Flexural strength (MPa) | Source |
|---|---|---|---|---|
| PVDF | Graphite 74% | 119 | 37.2 | U.S. Pat. No. 4,214,969 |
| PVDF | Graphite, 74% and carbon fibers | 109 | 42.7 | U.S. Pat. No. 4,339,332 |
| Vinyl ester | Graphite, 68% | 85 | 40 | U.S. Pat. No. 6,248,467 |

TABLE 9-continued

| Resin | Filler, wt % | Conductivity (S/cm) | Flexural strength (MPa) | Source |
|---|---|---|---|---|
| Vinyl ester | Graphite, 75% | 114 | 31.25 | U.S. Pub. No. 2005/0001352 |
| Polybutadiene | Graphite, 52.28% and carbon fibers | 40 | 27.33 | U.S. Pat. No. 6,811,917 |
| Vinyl ester | Graphite, 75% and organo clay | 275 | 44.39 | Example 3 of USP 2006/0267235 |
| Vinyl ester | Graphite, 70 wt % and modified MWCNTs | 1340 | 47.14 | Example B2 of this invention |

The invention claimed is:

1. A method for preparing a fuel cell composite bipolar plate, which comprises:
   a) compounding vinyl ester and graphite powder to form bulk molding compound (BMC) material, the graphite powder content ranging from 60 wt % to 95 wt % based on the total weight of the graphite powder and vinyl ester, wherein 0.05-10 wt % carbon nanotubes modified with polyether amine, based on the weight of the vinyl ester resin, is added during the compounding;
   b) molding the BMC material from step a) to form a bipolar plate having a desired shaped at 80-200° C. and 500-4000 psi,
   wherein said modified carbon nanotubes are prepared by a process comprising the following steps: A) conducting a ring-opening reaction between the polyether amine and a dicarboxylic acid anhydride containing an ethylenically unsaturated group, so that a polyamic acid is formed; B) adding carbon nanotubes and a free radical initiator to the resulting reaction mixture from step A), and conducting a grafting reaction so that the polyamic acid is linked to the carbon nanotubes, wherein the polyether amine added is in an amount of 1-300 wt % of the carbon nanotubes added, and the free radical initiator added is in an amount of 0.1-150 wt % of the carbon nanotubes added or 50-200 mole % of the polyether amine.

2. The method as claimed in claim 1, wherein i) 0.05-10 wt % carbon nanotubes and 0.05-10 wt % polyether amine dispersant is added to during the compounding in step a), and the polyether amine is 0.1-200 wt % of the carbon nanotubes.

3. The method as claimed in claim 1, wherein the free radical initiator added is in an amount of 1-100 wt % of the polyether amine.

4. The method as claimed in claim 1, wherein said free radical initiator is selected from the group consisting of peroxide, hydroperoxide, azonitrile, redox system, persulfate, and perbenzoate.

5. The method as claimed in claim 4, wherein said free radical initiator is benzoyl peroxide, and said dicarboxylic acid anhydride containing an ethylenically unsaturated group is maleic anhydride.

6. The method as claimed in claim 1, wherein the polyether amine is polyether diamine having two terminal amino groups, and having a weight-averaged molecular weight of 200-4000.

7. The method as claimed in claim 6, wherein the polyether diamine is poly(propylene glycol)-bis-(2-aminopropyl ether) or poly(butylenes glycol)-bis-(2-aminobutyl ether).

8. The method as claimed in claim 1, wherein said carbon nanotubes are single-walled, double-walled or multi-walled carbon nanotubes, carbon nanohorns or carbon nanocapsules.

9. The method as claimed in claim 8, wherein said carbon nanotubes are single-walled, double-walled or multi-walled carbon nanotubes having a diameter of 10-50 nm, a length of 1-25 μm, a specific surface area of 150-250 $m^2g^{-1}$, and an aspect ratio of 10-1000 $m^2$/g.

* * * * *